US008227748B2

(12) United States Patent
Berg et al.

(10) Patent No.: US 8,227,748 B2

(45) Date of Patent: Jul. 24, 2012

(54) CONFINING POSITIVE AND NEGATIVE IONS IN A LINEAR RF ION TRAP

(75) Inventors: Christian Berg, Roslindale, MA (US); Desmond Allen Kaplan, Billerica, MA (US); Karsten Michelmann, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 141 days.

(21) Appl. No.: 12/784,473

(22) Filed: May 20, 2010

(65) Prior Publication Data

US 2011/0284738 A1 Nov. 24, 2011

(51) Int. Cl.
*H01J 49/26* (2006.01)
*B01D 59/44* (2006.01)

(52) U.S. Cl. ......................... 250/283; 250/292; 250/282

(58) Field of Classification Search .......... 250/282–283, 250/290–293

See application file for complete search history.

(56) References Cited

U.S. PATENT DOCUMENTS 5,572,035 A 11/1996 Franzen
6,838,666 B2 * 1/2005 Ouyang et al. ................ 250/292
7,026,613 B2 4/2006 Syka
7,288,761 B2 * 10/2007 Collings ....................... 250/292
7,391,021 B2 * 6/2008 Stoermer et al. .............. 250/292
7,534,622 B2 * 5/2009 Hunt et al. ..................... 436/173
7,557,344 B2 * 7/2009 Chernushevich et al. ..... 250/292
2005/0199804 A1 9/2005 Hunt
2005/0263695 A1 12/2005 Syka
2006/0169884 A1 * 8/2006 Syka ............................ 250/282
2008/0014656 A1 1/2008 Thomson
2008/0128611 A1 * 6/2008 McLuckey et al. ........... 250/283
2008/0156984 A1 7/2008 Makarov
2008/0302958 A1 * 12/2008 Green ........................... 250/282
2011/0186724 A1 * 8/2011 Nolting et al. ................ 250/282

OTHER PUBLICATIONS

Huang, et al., “Electron-Transfer Reagent Anion Formation via Electrospray ionization and Collision-Induced Dissociation”, Anal. Chem. Nov. 1, 2006, vol. 78, 7387-7391.

McLuckey, et al., “Ion/Ion Chemistry of High-Mass Multiply Charged Ions”, Mass Spectrometry Reviews, 1998, 17, 369-407.

Wu, et al., “Positive Ion Transmission Mode Ion/Ion Reactions in a Hybrid Linear Ion Trap”.

Xia, et al., “Evolution of Instrumentation for the Study of Gas-Phase Ion/Ion Chemistry Via Mass Spectrometry”, J Am Mass Spectrom, 2008 19, 173-189.

Zubarev, et al., “Electron Capture Dissociation of Multiply Charged Protein Cations. A Nonergodic Process”, J. Am. Chem. Soc., 1998, 120, 3265-3266.

* cited by examiner

*Primary Examiner* — Jack Berman
*Assistant Examiner* — David E Smith
(74) *Attorney, Agent, or Firm* — Law Offices of Paul E. Kudirka

(57) ABSTRACT

In a linear ion trap, ions with two polarities are confined radially via an RF potential between the rods comprising the trap. Axially, ions of at least one polarity are confined via DC potentials applied to the elements of the trap or electrodes at the ends of the trap whereas ions of the other polarity are axially confined by a combination of pseudopotentials and/or DC potentials.

18 Claims, 5 Drawing Sheets

DC/RF confined
analyte/ product ions

RF only confined
analyte/product ions

CONFINING POSITIVE AND NEGATIVE IONS IN A LINEAR RF ION TRAP

BACKGROUND

The present invention provides methods useful in operating a mass spectrometer incorporating a linear ion trap to simultaneously confine ions of opposite polarity in the linear ion trap and to react said ions inside the linear ion trap by charge transfer reactions, like electron transfer dissociation (ETD), negative electron transfer dissociation (NETD) or charge reducing proton transfer reactions (PTR).

A mass spectrometer typically comprises an ion source, a mass analyzer and an ion detector. Analyte substances can be ionized with a variety of techniques, for example by electron impact ionization (EI), chemical ionization (CI), electrospray ionization (ESI) or matrix assisted laser desorption/ionization (MALDI). The analyte ions are guided from the ion source to the mass analyzer. Any mass analyzer separates ions according on their mass to charge ratio, m/z, where m is the mass of the ions and z is the number of elementary charges of the analyte ions, i.e. the number of excess protons or electrons. Whenever the "mass of the ions" is referred to below, it is normally to be understood as the charge-related mass m/z. The separation can be in time, e.g., in a time-of-flight analyzer, in space, e.g. in a magnetic sector analyzer, or in a frequency space, e.g. in an ion cyclotron resonance cell (ICR). The analyte ions can also be separated according to their stability in a radio frequency (RF) multipole ion trap (two-dimensional or three-dimensional quadrupole ion trap) or a quadrupole filter. The mass selectively separated analyte ions are detected by an ion detector providing electronic data to construct a mass spectrum (MS) of the analyte ions.

In so called tandem mass spectrometers, selected precursor ions (also called parent ions) are first isolated, and then fragmented into fragment ions (also called daughter ions). The measured mass spectra of fragment ions (MS/MS) are useful to determine structural components of the precursor ions, e.g. the sequence of the amino acids of a peptide. Second generation fragment spectra (also called granddaughter ions) can also be measured as fragment ion spectra of isolated and fragmented daughter ions.

In the mid 1990's, McLuckey and coworkers pioneered the characterization of reactions between ions of opposite polarities inside three dimensional quadrupole ion traps (McLuckey et al., Mass Spectrometry Reviews, 1998, vol. 17, p. 369-407: "Ion/Ion Chemistry Of High-Mass Multiply Charged Ions"). The observed ion-ion-reactions include reactions between multiply charged positive ions with singly charged negative ions and reactions between multiply charged negative ions with singly charged positive ions, e.g. by proton transfers and electron transfers.

Three-dimensional quadrupole ion traps (3D ion traps) comprise a ring electrode and two end cap electrodes. The ring electrode is usually supplied with a one-phase RF voltage while the end cap electrodes are basically grounded; other modes of operation are possible. In the interior of the 3D ion trap, a RF quadrupole field is generated which oscillates with the frequency of the RF voltage. The quadrupolar RF field tends to drive ions towards the center of the trap. The restoring force—i.e. the force pushing ions towards the center of the trap—in the 3D ion trap is usually described by a so-called pseudo-potential. The pseudo-potential is determined by temporally averaging the effects of the real electric RF field on the ions. The pseudo-potential increases uniformly and quadratic in all directions from the center of the trap and is effective for both polarities. That is, both positive and negative ions can be stored simultaneously in the 3D ion trap. Therefore, 3D ion traps are well suited for reactions between positive and negative ions.

However, 3D traps have the disadvantage that they are not readily interfaced with downstream ion optics or analyzers. That is, after ions have been injected into, and reacted in a 3D trap, they cannot be easily extracted as a low energy ion beam. Because the ions ejected from the 3D trap have a broad distribution of ion energies, it is difficult to capture, guide, or analyze these ions in downstream devices.

In contrast, two dimensional multipoles are readily interfaced with upstream and downstream devices. Two dimensional quadrupole ion traps (2D ion traps, linear ion traps) are typically designed as multipole rod systems, e.g. as quadrupole, hexapole or octopole rod systems having two, three or four pairs of pole rods arranged symmetrically about a central axis. An RF voltage is applied in a first phase to every second rod and in an opposite phase to the remaining rods for generating a radially repelling pseudo-potential inside the linear ion trap. Quadrupole rod systems exhibit a quadratic rise in the pseudo-potential with radial distance from the central axis. Under the influence of the radially confining RF field and via collisions with a damping gas, ions are accumulated as a thread-like cloud along the central axis. 2D ion traps have two ends along the central axis. Ions may be injected into and ejected out of the trap along the central axis from either end. In the axial direction of the linear ion trap, ions have traditionally been confined by DC potentials applied to the rods or other electrodes, such as apertured electrodes placed at the ends of the linear trap. In the elongated volume of the linear ion trap defined by the rods, the DC potentials generate electrostatic fields that axially confine either positive ions or negative ions, but cannot simultaneously confine both.

The basic principle for confining ions of both polarities inside a linear ion trap has been known for a long time. U.S. Pat. No. 5,572,035 A (Franzen) discloses that: "All types of cylindrical or conical ion guides [ . . . ] can be used as storage devices if the end openings are barred for the exit of ions by reflecting RF or DC potentials. With RF field reflection, ions of both polarities can be stored. With DC potentials, ion guides store ions of a single polarity only." The cited '035 patent generally discloses that ions of both polarities are repelled in the axial direction at a pseudo-potential barrier formed by inhomogeneous RF fields at the ends of linear ion traps. Further embodiments of linear ion traps with pseudo-potential barriers are disclosed in following: U.S. Pat. No. 7,026,613 B2 (Syka: "Confining positive and negative ions with fast oscillating electric potentials"), U.S. Pat. No. 7,227,130 B2 (Hager: "Method for Providing Barrier Fields at the Entrance and Exit End of a Mass Spectrometer"), U.S. Pat. No. 7,288,761 B2 (Collings: "System and method for trapping ions") and U.S. Pat. No. 7,557,344 B2 (Chernushevich: "Confining Ions with Fast-Oscillating Electric Fields"). All aforementioned linear ion traps confine ions of both polarities by pseudo-potential barriers at both ends of the linear ion trap. An further overview of RF devices used to study ion-ion reactions is provided in the review article by Y. Xia and S. A. McLuckey (Xia et al., Journal of the American Society for Mass Spectrometry, 2008, vol. 19, p. 173-189: "Evolution of Instrumentation for the Study of Gas-Phase Ion/Ion Chemistry via Mass Spectrometry")

One difficulty with the prior art method of confining ions in a linear ion trap via pseudo-potential barriers at both ends of the trap is that the "height" of these axial pseudo-potential barriers is dependent on the mass of the ion. Thus, if a precursor ion is very massive and either the reagent or product ions are very light, then the pseudo-potential barriers may not be able to axially confine both types of ions simultaneously because the pseudo-potential is inversely proportional to the mass of the ions.

As an alternative to rod systems, linear ion traps can be designed as a set of electrodes arranged along an axis as a stack of ring electrodes. Such prior art devices include RF ion funnels or RF ion tunnels, or a stack of apertured electrodes having opposing hyperbolic indentations extending into the aperture (U.S. Pat. No. 7,391,021 B2 by Stoermer et al.: "Ion guides with RF diaphragm stacks").

In 1998, McLafferty et. al. presented a technique for fragmenting protonated proteins (Journal of American Chemical Society, 1998, vol. 120, issue 12, p. 3265-3266: "Electron capture dissociation of multiply charged protein cations. A nonergodic process"). The protonated proteins are fragmented by interacting with thermal electrons (ECD, Electron Capture Dissociation) while both are stored inside an ICR cell of a Fourier transform mass spectrometer. The magnetic field used in ICR mass spectrometers is important for ECD in these instruments. The same magnetic field that confines ions in and ICR cell is also used to radially confine electrons during the ECD process. The primary difficulty with implementing ECD on other types of mass spectrometers—i.e. instruments that do not use magnetic fields—is that the inhomogeneous RF fields of RF traps and RF ion guides, which are conventionally used to confine ions, do not confine electrons. This is because the mass of the electron is much smaller compared to the mass of ions. Electrons injected into these devices also fail to remain at near thermal energies for a time interval that is sufficient to allow ECD reactions.

In 2004, Hunt et al. presented a technique for fragmenting protonated proteins based on ion-ion reactions of protonated proteins with singly charged negative reagent ions (U.S. Pat. No. 7,534,622 B2 by Hunt et al.: "Electron transfer dissociation for biopolymer sequence mass spectrometric analysis"). Suitable negative reagent ions for electron transfer dissociation (ETD) are typically radical anions of polyaromatic compounds, such as those of fluoranthene, fluorenone and anthracene. Alternatively, it is also known that some monoaromatic or even non-aromatic compounds, such as 1-3-5-7-Cyclooctatetraen, are also suitable. The ETD reagent anions easily donate an electron to a protonated protein forming stable, neutral molecules with complete electron configuration.

The ETD reagent anions are typically generated in NCI ion sources (NCI=negative chemical ionization) by electron capture or by electron transfer. NCI ion sources have essentially the same design as chemical ionization (CI) ion sources, but they are operated in a different way in order to obtain large quantities of low-energy electrons. However, ETD reagent anions can also be generated directly or indirectly in other atmospheric pressure ionization sources, such as electrospray ionization, atmospheric pressure chemical ionization, atmospheric sampling glow discharge ionization, or other discharge sources; essentially any source that can generate an excess of thermal electrons. "Indirect generation" means that anions of selected substances are generated and subsequently converted by, for example, collision induced dissociation or metastable dissociation into radical anions that are suitable as ETD reagent anions (Huang et al., Analytical Chemistry, 2006, vol. 78, p. 7387-7391: "Electron-Transfer Reagent Anion Formation via Electrospray Ionization and Collision-Induced Dissociation").

In U.S. Pat. No. 7,534,622 B2, Hunt et al. disclose that ion-ion reactions involving the transfer (abstraction) of electrons from multiply charged protein anions can be used to effect negative electron transfer dissociation (NETD) of the protein anions. The reagent ions suitable for NETD are singly charged radical gas-phase cations, having a polarity opposite to the protein anions.

In U.S. Pat. No. 7,534,622 B2, Hunt et al. disclose that ETD and NETD can take place inside RF containment devices, like 3D ion traps or linear ion traps with pseudo-potential barriers at their ends, or inside RF ion guides. The RF containment devices confine ions of both polarities by appropriate pseudo-potentials in all directions. RF ion guides confine ions only in the radial direction and are typically used to transfer ions in the vacuum systems of mass spectrometers, e.g. from an ion source to a mass analyzer. RF ion guides are typically designed as multipole rod systems (without axial confinement) or as RF ion funnels or tunnels formed by a stack of ring electrodes arranged along an axis.

Wu et al. demonstrated that ETD can be implemented in a linear quadrupole ion trap without mutual confinement of ions of opposite polarity (Wu et al., Analytical Chemistry, 2004, vol. 76, p. 5006-5015: "Positive Ion Transmission Mode Ion/Ion Reactions in a Hybrid Linear Ion Trap"). They describe three ways how reactions between ions of opposite polarities can be effected in "transmission modes" of a linear ion trap, whereby ions of both polarities are introduced in the axial direction. The first transmission mode involves the storage of neither ion polarity and relies on reactions taking place between the ions of opposite polarity as they are continuously admitted through the linear ion trap utilized as a RF ion guide. The second and third transmission modes involve storing ions of one ion polarity by appropriate DC potentials applied to containment lenses at the ends of the linear ion trap, whereas ions of the other polarity are continuously passing through the linear ion trap. The quadrupole field of the ion trap focuses ions of both polarities in the radial direction onto the central axis and leads to a spatial overlap of positive and negative ions and the resulting ETD reactions.

A particular application of ETD is the sequence analysis of peptides and proteins by mass spectrometry. The terms "polypeptide", "peptide", "oligopeptide" and "protein" refer to a polymer of amino acids without regard to the length of the polymer; thus, the terms are used interchangeably. These terms also do not specify or exclude chemical or post-expression modifications of the polypeptides. ETD promotes efficient fragmentation of peptide bonds all-over the protein backbone of proteins and thus makes it possible to deduce their amino acid sequences. The sequence analysis typically comprises the steps of: (a) generating and isolating multi-charged protein cations; (b) confining the protein cations in an RF containment device; (c) injecting ETD reagent anions into the RF containment device to facilitate electron transfer from the ETD reagent anions to the multi-charged protein cations, thus inducing the production of ETD fragment ions; and (d) acquiring a mass spectrum of the ETD fragment ions in a mass analyzer. The fragment ion spectrum contains signals arranged like ladders, and the mass distances between the signals allow to determine the amino acids and thus to deduce the amino acid sequence.

SUMMARY

In accordance with the principles of the invention, in a linear ion trap, ions with two polarities are confined radially via an RF potential between the rods comprising the trap. Axially, ions of at least one polarity are confined via DC potentials applied to the elements of the trap or electrodes at the ends of the trap whereas ions of the other polarity are axially confined by a combination of pseudopotentials and/or DC potentials. Thus, the present invention allows ions of opposite polarity to be confined in a linear ion trap for reacting said ions inside the linear ion trap by ion-ion reactions, e.g. by electron transfer dissociation (ETD), negative electron transfer dissociation (NETD) and proton transfer reactions (PTR).

In accordance with one embodiment, ions of opposite polarity are confined within a linear ion trap having two ends and comprising at least one set of electrodes by a method comprising: (a) providing a first group of ions within the linear ion trap; (b) providing a second group of ions within the linear ion trap, the second ion group having opposite polarity than the first ion group; (c) providing RF voltages to the electrodes to radially confine the first ion group and the second ion group in the linear ion trap; and (d) providing a combination of DC and/or pseudo-potential barriers to axially confine the first and second group of ions in the linear ion trap, wherein at least one of said first and second group of ions is retained substantially via DC potential barriers.

In another embodiment, only the DC potential barriers are used to axially confine the first and second group of ions in the linear ion trap. In an additional step (e), the second group of ions can be accelerated through a volume occupied by the first group of ions such that ions of the first and second groups react to produce product ions. In this case, first and second groups of ions as well as the product ions are axially retained in the linear ion trap by the DC potential barriers.

In still another embodiment, the first group of ions is confined substantially by DC potential barriers and the second group of ions is confined substantially by pseudo-potential barriers. The ions of the first group have predominately a higher mass than the ions of the second group ions. The DC potential barriers at the ends axially confine the ions of the first group in the linear ion trap, whereas the pseudo-potential barriers are adjusted so as not to axially confine the ions of the first group in the linear ion trap. The mutual confinement is possible in this case because the pseudo-potential is inversely proportional to the mass of the ions, i.e. the pseudo-potential barrier is higher for the lighter ions of the second group and can compensate the repulsive effect of the DC potential barriers on second ion group. In the particular case that the pseudo-potential barriers are adjusted to solely confine the lighter ions within the linear ion trap against the DC potential barriers, the mutual confinement of analyte ions and reagent ions cannot be regarded as an RF confinement.

If the linear ion trap is used to facilitate ion-ion reactions between analyte ions and reagent ions of opposite polarity, the analyte ions nearly always have higher masses than the reagent ions that are suitable for producing the desired ion-ion reactions. The first ion group (including the analyte ions) is preferably introduced into the linear ion trap prior to the reagent ions (second ion group). Most preferably, the DC potential barriers are provided before introducing the first ion group, and the pseudo-potential barriers are provided after introducing the first ion group and prior to introducing the second ion group. The reagent ions can be suitable for electron transfer dissociation (ETD), negative electron transfer dissociation (NETD) or charge reducing proton transfer reactions (PTR). If used as a reaction cell, the linear ion trap is preferably filled with background gas to reduce the kinetic energy of ions introduced into the linear ion trap so that the ions can be trapped by the DC potential barriers and the pseudo-potential barriers, respectively.

For an MS/MS analysis, the analyte ions are isolated from other ions of the first ion group, e.g. by resonance ejection of the other ions from the linear ion trap or by a quadrupole filter prior to introducing into the linear ion trap. The product ions can be analyzed by resonance ejection from the linear ion trap or in an additional mass analyzer after the product ions are ejected from the linear ion trap and transferred to the additional mass analyzer. The additional mass analyzer might be but is not limited to time-of-flight, quadrupole, ion-cyclotron resonance, or other Fourier transform mass analyzers.

In yet another embodiment, the set of electrodes is preferably a set of 2N rods, where N is an integer greater than one, and an RF voltage is applied in a first phase to every second rod and in an opposite phase to the remaining rods for radial confinement of the ions. The pseudo-potential barriers at the ends of the linear ion trap can be generated by one of the following: by applying an additional RF voltage to electrodes arranged at the ends of the linear ion trap or along the linear ion trap; by applying unbalanced RF voltages to the rods or by arranging the rods such that a time-varying potential is constituted at the center axis of the linear ion trap; and by applying an additional RF voltage of single phase to all rods. However, the set of electrodes can also be a set of apertured electrodes that are arranged along a center axis and have hyperbolic indentations extending into the aperture. The hyperbolic indentations are known from RF ion guides (U.S. Pat. No. 7,391,021 B2 by Stoermer et al.: "Ion guides with RF diaphragm stacks")

In another embodiment, the DC potential barriers at the ends of the linear ion trap are generated by applying DC potentials between electrodes of the linear ion trap and electrodes adjacent to the ends of the linear ion trap. A wide variety of potentials may be used, however, as an example, if the ions of the first group are positively charged, the DC potential difference between electrodes of the linear ion trap and the adjacent electrodes is preferably between −0.2 to −2.0 Volts, more preferably between −0.3 and −0.9 Volts and most preferably between −0.5 and −0.8 Volts. The optimum potential will depend on the relative masses of the analyte and reagent ions. Alternatively, if the ions of the first group are negatively charged, then the DC potential difference is preferably between 0.2 to 2.0 Volts, more preferably between 0.3 and 0.9 Volts and most preferably between 0.5 and 0.8 Volts. The barriers can be adjusted to simultaneously confine ions of both polarities.

In yet another embodiment, the linear ion trap comprises at least a first and a second segment. In a first step, the first group of ions and the second group of ion are introduced into the first and second segment, respectively, wherein both ion groups are confined in the segments by DC potential barriers of appropriate polarity. In a second step, the pseudo-potential barriers and the DC potential barriers at the ends of the trap are provided. In a third step, the DC potential barriers around the segments are turned off. The linear ion trap most preferably comprises a set of 2N segmented rods, with N an integer greater than one, and an RF voltage is applied in a first phase to every second rod and in an opposite phase to the remaining rods for radial confinement of the ions. DC potentials can be applied to the segmented rods and end electrodes to provide the DC potentials barriers around the segments.

In accordance with another aspect of the present invention, there is provided a method of reacting ions of opposite polarity within a linear ion trap comprising a set of electrodes, wherein the linear ion trap is preferably divided into three segments. The method comprises: (a) providing DC potential barriers between the segments and at the ends of the linear trap to axially confine a first ion group in the middle segment and to axially confine a second group of ions in one of the outer segments, the second group of ions having opposite polarity than the first group of ions; (b) providing RF voltages to the electrodes to radially confine the first ion group and the second ion group in the linear ion trap; (c) introducing the first group of ions within the middle segment and the second group of ions within the one outer segment; and (d) providing a DC potential gradient in the one outer segment to move ions of the second group across the DC potential barrier of the middle segment to facilitate reactions between the ion groups.

In another embodiment, DC potential gradients are provided in both outer segments and are simultaneously or alternately turned off and on, most preferably more than once in order to facilitate an effective mixing of both ion groups in the middle section of the linear ion trap.

The set of electrodes can be a set of segmented rods. In this case, the DC potential gradients can be provided by further dividing the rods in the outer segments into sub-segments and by applying DC potentials to the sub-segments of rods. However, the DC potential gradients in a segment can also be provided by applying DC potentials together with the RF voltages to thin conductive coatings, wherein the conductive coatings are isolated by an insulating layer from the metallic rods and have a sufficient electric resistivity.

The set of electrodes can also be a set of apertured electrodes that are arranged along the center axis of the linear ion trap and have hyperbolic indentations extending into the aperture. In that case, the DC potential gradients can easily be provided by applying appropriate DC potentials to the apertured electrodes of the outer segments.

Ion-ion reactions between ions of opposite polarity take place in the middle segment of the linear ion trap, after a DC potential gradient drives the reagent ions from one outer segment across the DC potential barrier of the middle segment into the other outer segment.

In alternate embodiments a linear ion trap with two segments is used. The ions of opposite polarity are confined by DC potential barriers of appropriate polarity. The reagent ions can be moved by a DC potential gradient across the DC potential barrier between the segments to facilitate ion-ion reactions inside the segment holding the analyte ions. However, an additional pseudo-potential barrier is needed at the back end of the segment holding the analyte ions to confine the reagent ions in the linear ion trap.

A first advantage of the present invention is that, unlike prior art methods, ions of opposite polarity and widely differing masses can be confined axially within a linear ion trap (or within segments of the linear ion trap). In the case of heavy analyte ions and light reagent ions with opposite polarity, the axial confinement of both ion groups can be achieved by providing DC potential barriers and pseudo-potential barriers at the same time so that the axial confinement of both groups is decoupled. The decoupling is possible because the pseudo-potential is inversely proportional to the ion mass. Therefore, a DC potential is used to axially confine high mass analyte ions whereas an RF potential is used to axially confine the low mass reagent ions. Even though, the DC potential is attractive to the reagent ions—being repulsive to the oppositely charge analyte ions—the pseudo-potential barriers are higher for these light ions and can retain them against the axial DC field. The pseudo-potential barrier has little effect on the high mass analyte ions which would escape the linear ion trap without the action of the DC potential barriers. If the pseudo-potential barriers are mainly needed to axially confine the lighter ions within the linear ion trap against the counteracting DC potential barriers, the mutual confinement according to the invention cannot be regarded as a RF confinement. In the case that both groups are confined in separate segments and the reagent ions are driven across the DC barriers of the analyte ions segment, there are actually no requirements concerning the mass difference between the ion groups for the axial confinement.

In both cases, the linear ion trap is neither operated as a RF confinement device nor as an RF ion guide. The experimental results from ion-ion reactions in RF ion guides show a low efficiency due to the limited transmission time of ions passing only once through the RF ion guide.

A second advantage of the present invention is the high efficiency for trapping light reagent ions introduced into the linear ion trap. In the first aspect, the pseudo-potential barrier needed for confining the light reagent ions inside the linear ion trap is lower than in the case of mutual RF confinement, even in the presence of the repulsive DC potential barriers. In the case of mutual RF confinement, the pseudo-potential barriers have to be raised to a level at which the heavy analyte ions are axially confined. At that level, the pseudo-potential barriers experienced by the light reagent ions are higher than needed to axially confine the lighter reagent ions alone. Furthermore, the light reagent ions that are typically introduced into the linear ion trap after the heavy analyte ions so that the light reagent ions have to overcome an unnecessary high pseudo-potential barrier when they are transferred from their ion source into the linear ion trap. This high pseudo-potential barrier results in a low injection and trapping efficiency for the reagent ions. In the present invention, the trapping of both ion groups is decoupled and the injection efficiency of light reagent ions is improved even though the pseudo-potential has to compensate the repulsive DC potential barrier.

Using a segmented ion trap can result in an even better injection efficiency because the reagent ions are not introduced over a pseudo-potential barrier into a segment of the linear ion trap.

In U.S. Pat. No. 7,534,622 B2, Hunt et al. meet both requirements of mutual RF confinement and of high injection efficiency by using a segmented linear ion trap. In a first step, ions of opposite polarity are introduced and confined in two separated segments of the linear ion trap. Both ion groups are trapped by providing DC potential barriers of opposite polarity at the segments so that ions of both groups do not react with each other. In a second step, pseudo-potential barriers are provided at the ends of the linear ion trap that are appropriate to mutually confine both ion groups (RF confinement). In a third step, the DC potential barriers are turned off so that ions of both polarity are solely confined by the pseudo-potential barriers and mix inside the linear ion trap leading to ion-ion reactions and to product ions. In contrast to the method disclosed by Hunt et al., the present invention provides pseudo-potential barriers and DC potential barriers at the same time for confining ions of both polarity within the same volume (or a shared volume) of the linear ion trap.

A third advantage of the present invention is an increased efficiency for ion-ion reactions compared to the same reactions performed in mutual RF confinement or in transmission mode of RF ion guides. A good measure for the efficiency is the time needed to produce the product/fragment ions and how many different product/fragment ions are produced and confined. Particular for electron transfer dissociation of protein ions, the later measure is termed sequence coverage.

The reasons for the increased efficiency are not completely understood by now. On the one hand, the decoupled axial confinement of reagent ions and analyte ions has the additional effect that light fragment ions of low charge states produced in ion-ion reactions are confined in the linear ion trap operated according to the invention, whereas they are not or barely confined in a linear ion trap using a mutual RF confinement. Due to the more efficient confinement of these light fragment ions, the fragment ion spectrum comprises more fragment ion signals resulting in an increased sequence coverage. On the other hand, one might expect the DC potential barriers provided at the ends of the linear ion trap to push the light reagent ions towards the ends where they might be trapped by the pseudo-potential barriers. One might expect that this would tend to segregate the ions—light reagent ions towards the ends of the trap and heavier analyte ions towards the middle of the trap. One might expect this to reduce the efficiency of the reaction. Surprisingly, this seems not to be the case. If the ions are segregated to different regions in the trap then the segregation does not have the expected effect. One might imagine the light regent ions are located as ion clouds at ends of the trap and may attract the analyte ions due to their space charge. The high ion density of both (or at least one ion species) in the volume shared by both ion species (reagent and analyte ions) may be another reason for the high efficiency for dissociating ion-ion reactions in linear ion traps operated according to the invention.

The above and other features of the present invention are further described in the description below of exemplary embodiments of the invention.

BRIEF DESCRIPTION OF THE DRAWINGS

Preferred embodiments of the present invention will be described below in detail with reference to the drawings. In the drawings, like elements are identified by like reference numbers. In the drawings, elements are not drawn to scale but are illustrative of the embodiments described.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 1:
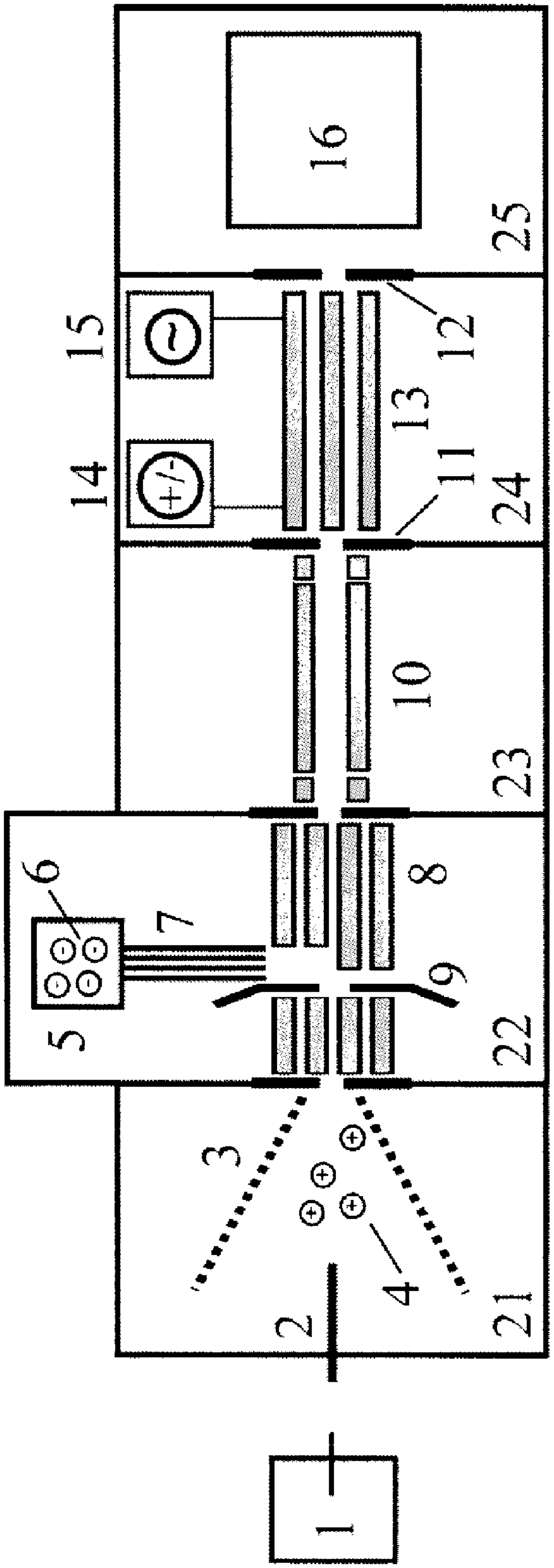
FIG. 1 PRIOR ART
FIG. 1 is a schematic representation of a mass spectrometer with a linear ion trap known from prior art.

FIG. 1 is a schematic representation of a mass spectrometer with a linear ion trap (13). Analyte ions are generated at atmospheric pressure with an electrospray ion source (1) and transferred via a capillary (2) into a first vacuum chamber (21), where the analyte ions (4) are collected by an RF ion funnel (3) and introduced into a second vacuum chamber (22). Here, a split octopole RF ion guide (8) is located, together with an ion source for ETD, NETD, and PTR reagent ions (5). The reagent ions (6) are guided with a second RF octopole ion guide (7) to and ejected into the split RF octopole (8) by appropriate DC potentials applied to deflecting electrodes (9). Analyte ions as well as reagent ions are transferred (one after another) to a vacuum chamber (23) where a quadrupole rod set with stubby electrodes (10) is operated either in a RF-only transmission mode to guide ions to a fourth chamber (24) or in a mass selective RF/DC mode to transfer only ions of a predetermined mass. The linear ion trap (13) comprises a RF hexapole rod set that is operated as a reaction cell for ion-ion reaction between the analyte ions and the reagent ions. The vacuum chamber (24) is filled with Nitrogen as background gas at a pressure of about 0.1 to 1 Pascal to reduce the kinetic energy of ions introduced into the linear ion trap (13). Both ion groups are radially confined in the linear ion trap (13) by applying a RF voltage in a first phase to every second rod and in an opposite phase to the remaining rods. For the axial confinement of both ion groups, pseudo-potential barriers can be provided at the outer ends of the linear ion trap (13) by applying an additional high frequency voltage of single phase (15) to all hexapole rods.

According to the present invention, DC potential barriers are simultaneously provided at the ends of the linear trap by applying DC potentials (14) to the rod set and to the end electrodes (11) and (12). After a predetermined reaction time, fragment ions and remaining analyte ions are transferred into the vacuum chamber (25) of a mass analyzer (16). The mass analyzer (16) can for example be an orthogonal time-of-flight mass analyzer or an ICR cell. High-vacuum pumps (not shown) maintain the vacuum in the vacuum chambers (21) to (25) at different pressures.

Figure 2:
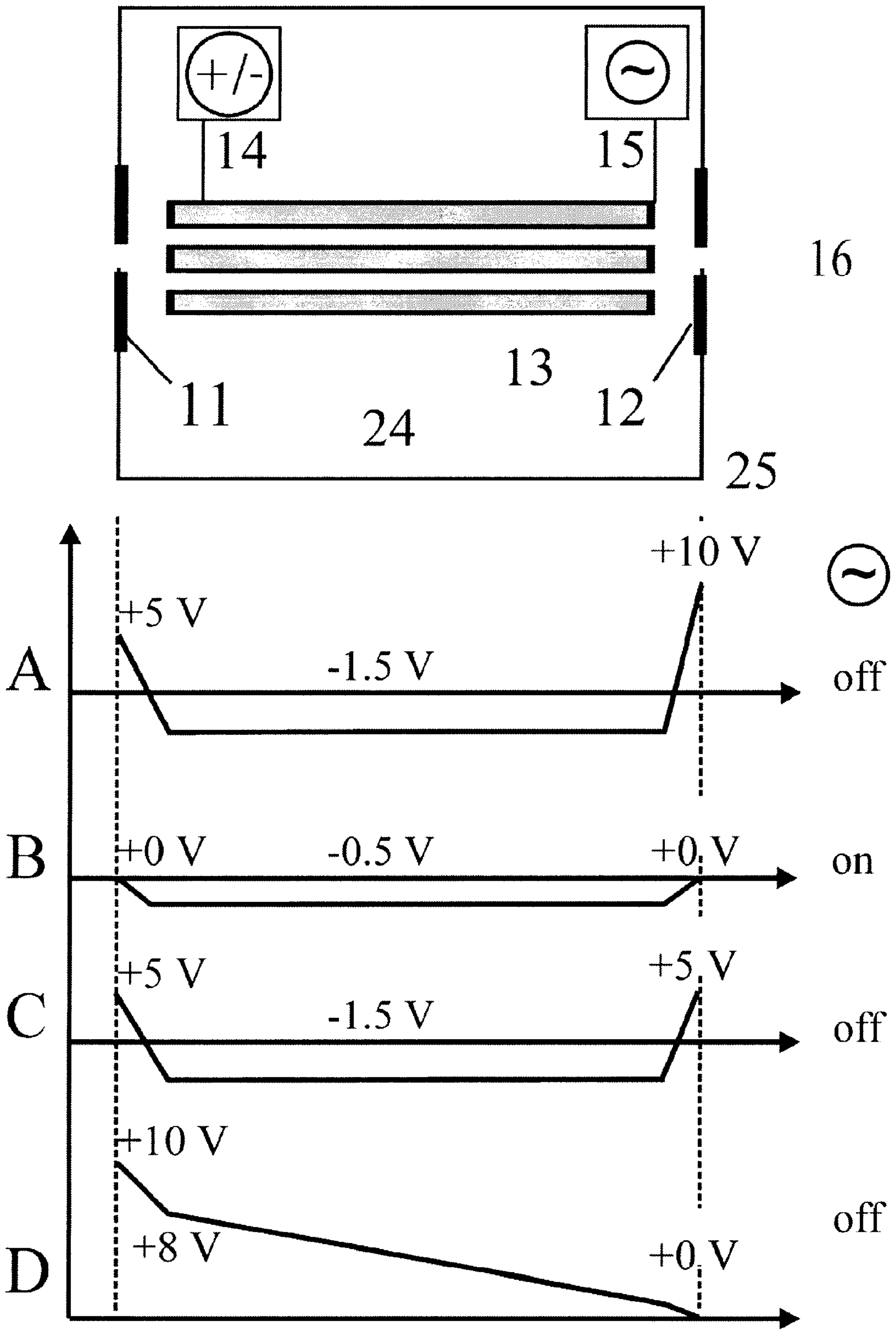
FIG. 2 shows schematic representations of a first embodiment of a linear ion trap operation to achieve injection and simultaneous confinement of positive and negative ions facilitating ion-ion reactions.

FIG. 2 shows schematic representation of a first embodiment of a linear ion trap operation with steps A to D to achieve injection and mutual confinement of analyte cations and negative anions in order to facilitate ETD reactions.

In step A, analyte cations are introduced into the linear ion trap (13). The pseudo-potential barriers at the ends of the linear trap are turned off. DC potentials of +5 V and +10 V are applied to end electrodes (11) and (12), respectively. The hexapole rod set is set to a DC bias of −1.5 V. As described in FIG. 1, analyte cations from an electrospray ion source are transferred through RF ion guides in chambers (21) and (22) and are mass selectively filtered in quadrupole filter (10), before they are injected over the DC potential barrier at entrance electrode (11) into the linear ion trap (13). The kinetic energy of the analyte cations is reduced to thermal energy while moving through the background gas in chamber (24) so that they can be trapped by the DC potential barriers at end electrodes (11) and (12) of the linear ion trap (13).

In step B, the reagent anions are introduced into the linear ion trap (13). The DC potential barriers are reduced to −0.5 V—a level sufficient to axially confine the thermalized analyte cations. The pseudo-potential barriers are turned on to axially confine the reagent anions against the counteracting DC potential barriers. The reagent anions are injected over the pseudo-potential barrier into the linear ion trap. Because of their initial kinetic injection energy, the reagent anions may also reach the exit end of the linear ion trap and might get trapped at both ends due to the DC potential barriers between the hexapole rod set and end electrodes (11) and (12). The ion-ion reactions between the analyte cations and the reagent anions immediately start when the reagent anions are injected into the linear ion trap. An active mixing step is not necessary.

In alternate embodiments, the DC potential barriers may be turned off in step B for a predetermined time.

In step C, ion-ion reactions are stopped by turning off the pseudo-potential barriers and by raising the repelling DC potential barriers so that the reagent anions are ejected from the linear ion trap (13). In alternate embodiments the DC potential barriers can be raised to eject the reagent ions without turning off the pseudo potential barriers.

In step D, the fragment ions and remaining analyte ions are ejected from the linear ion trap (13) and are transferred to a mass analyzer to acquire a fragment ion spectrum. The fragment ions and analyte ions are ejected by providing a DC potential gradient along the hexapole rod set. There are different prior art techniques for generating a DC potential gradient along multipole rod sets, for example in U.S. Pat. No. 7,164,125 B2 (Franzen). In the alternate embodiment from step C, fragment ions would be ejected over the remaining pseudo-potential barrier. In further alternate embodiments, no DC gradient is imposed along trap (13), rather the potential on end electrode (12) is lowered to a potential below trap (13) and the ions are allowed to diffuse out.

Figures 3A, 3B:
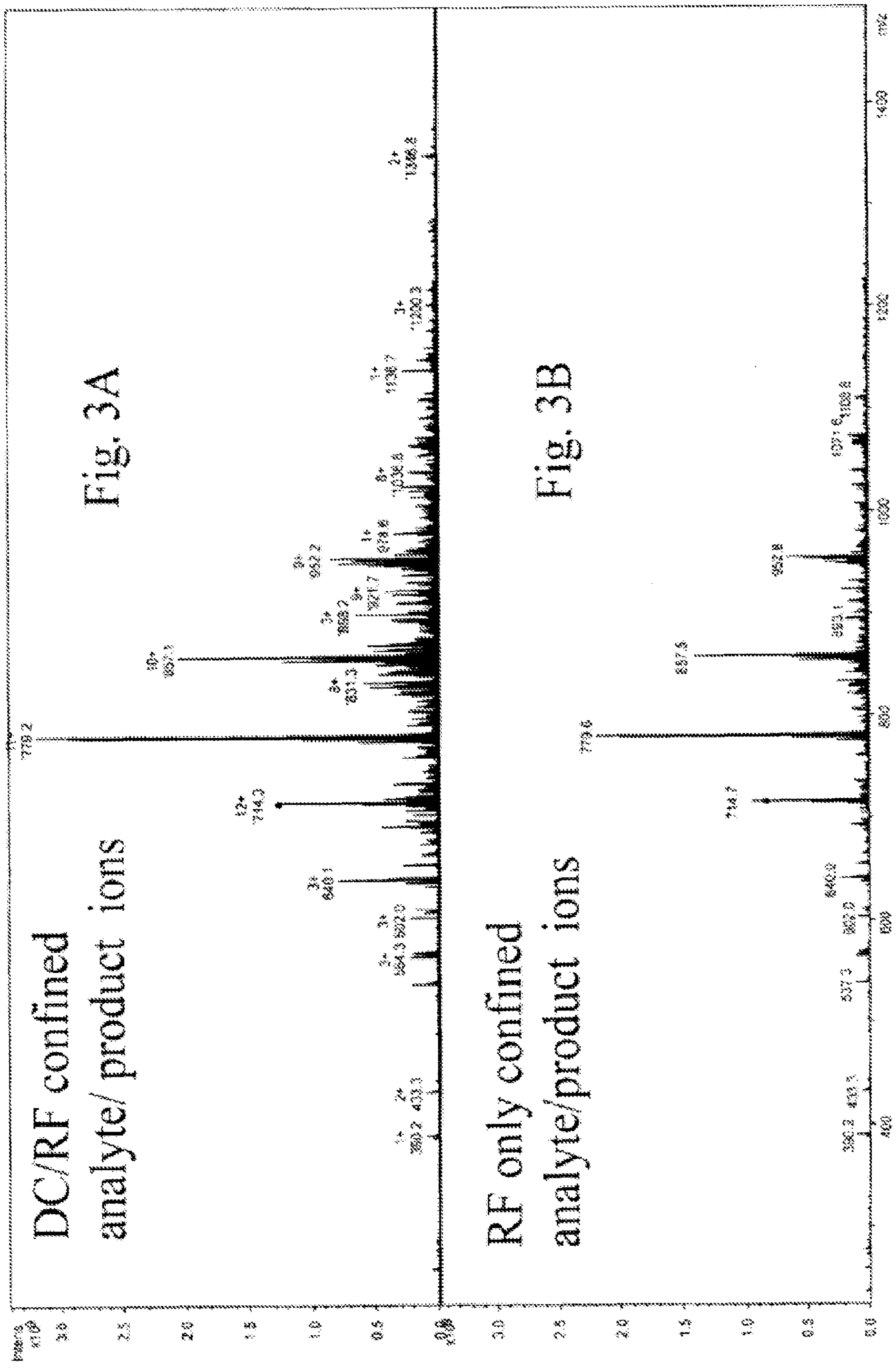
FIG. 3A shows an ETD fragment ion spectrum resulting from reaction of ubiquitin cations, at m/z 714 with z=+12, with azulene radical anions while operating the linear ion trap with DC/RF confinement.
FIG. 3B shows an ETD fragment ion spectrum resulting from reaction of ubiquitin cations, at m/z 714 with z=+12, with azulene radical anions while operating the linear ion trap with mutual RF confinement, respectively.

FIG. 3 shows experimental data of two ETD fragment ion spectra resulting from a reaction of ubiquitin cations, with m/z 714 and z=+12, with azulene anions. The fragment ion spectrum of FIG. 3A was acquired with the linear ion trap (13) operated with DC/RF confinement according to the invention whereas that of FIG. 3B was acquired with the linear trap (13) operated with mutual RF confinement. The fragment ion spectrum of FIG. 3A, acquired with DC/RF confinement, shows more fragment ion signals and more intense signals than the fragment ion spectrum of FIG. 3B, acquired with only mutual RF confinement. The peptide sequence coverage from the spectrum of FIG. 3A with DC/RF confinement is 85% compared to 50% coverage from the spectrum of FIG. 3B with only mutual RF confinement. Furthermore, the reaction time needed for acquiring the spectrum of FIG. 3A is reduced by a factor of two compared to that required for the fragment ion spectrum of FIG. 3B along with the data of FIG. 3B having a lower sequence coverage.

Figure 4:
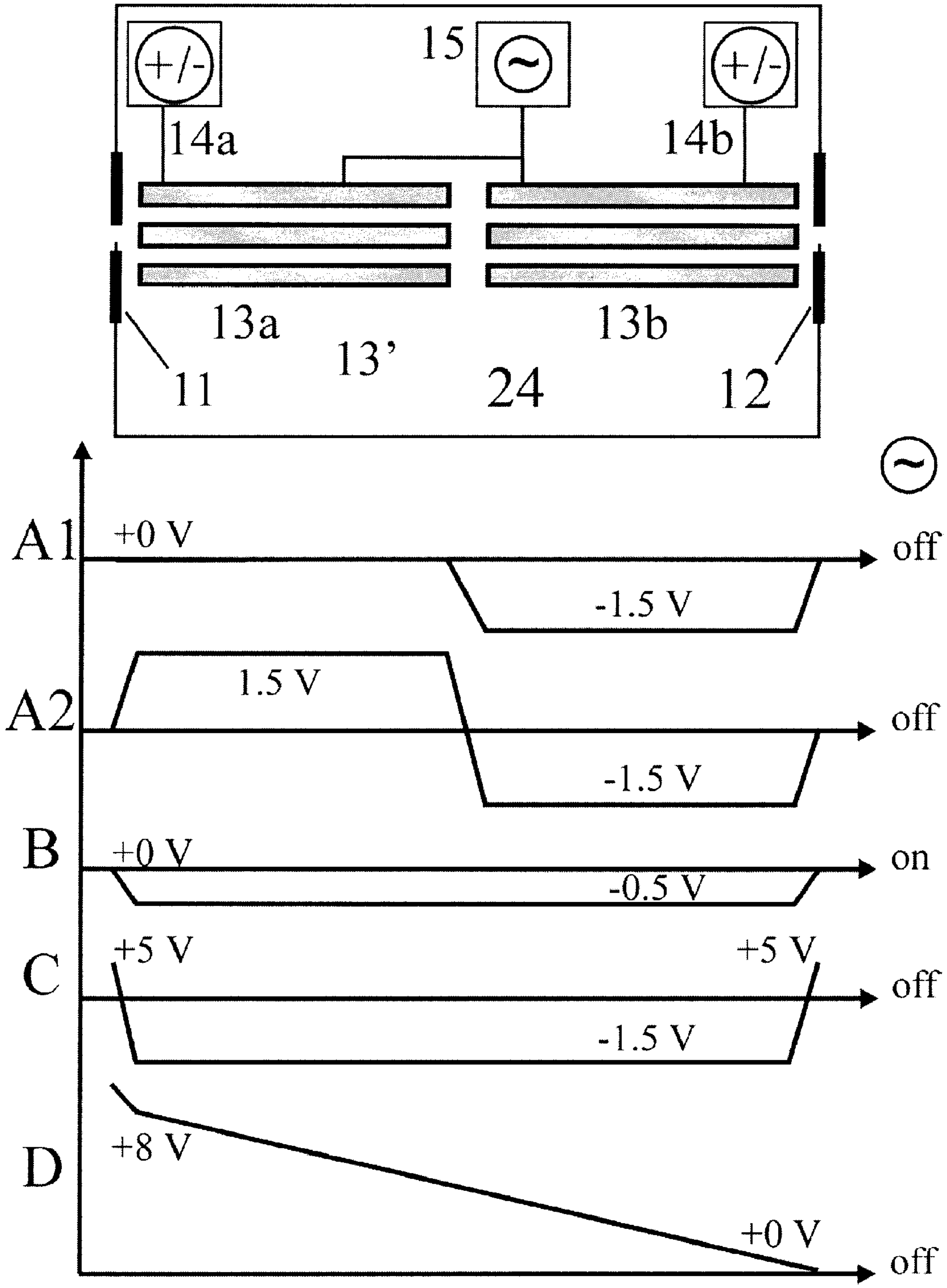
FIG. 4 shows schematic representations of a second embodiment of a linear ion trap operation wherein the positive and negative ions are at first introduced and trapped in segments of the linear ion trap and subsequently confined by providing pseudo-potential barriers and DC potential barriers at the ends of the linear ion trap.

FIG. 4 shows schematic representations of a second embodiment of a linear ion trap operation wherein a segmented linear ion trap (13') is used. The linear ion trap (13') comprises two hexapole rod sets (13*a*) and (13*b*). For the axial confinement of both ion groups, pseudo-potential barriers are provided at the ends of the linear ion trap (13) by applying an additional high frequency voltage of single phase (15) to all hexapole rods. According to the invention, DC potential barriers are provided at the ends by applying DC potentials (14*a*) and (14*b*) to the rod set and to the end electrodes (11) and (12). Both ion groups are radially confined in the linear ion trap (13') by applying RF potentials with alternating phases to adjacent rods in each segment, wherein the same phase is applied to a rod in the front segment and the adjacent rod in the back segment.

In step A1, analyte cations from the electrospray ion source (1) are introduced into the linear ion trap and stored in the back segment (13*b*) by applying appropriate DC potentials to the segments (13*a*) and (13*b*) and the end electrode (12). The analyte anions are trap in a DC potential well of −1.5 V. In the following step A2, reagent anions are introduced and stored in the front segment (13*a*) of the linear ion trap (13') by applying appropriate DC potentials (+1.5 V) of opposite polarity to the front segment (13*a*) and the end electrode (11). After step A2, the analyte and reagent ions are stored spatially separated in the two segments (13*a*) and (13*b*). In contrast to the embodiment shown in FIG. 1, the pseudo-potential barrier is turned off during the introduction of the reagent anions, i.e. that the reagent anions can be introduced with high efficiency.

After ions of both groups are thermalized via collisions with the background gas, the pseudo-potential barrier is turned on by applying an additional high frequency voltage of single phase (15) to all hexapole rods. Furthermore the DC barriers around the segments are turned off and lower DC potential barriers of −0.5 V are provided at the ends of the linear ion trap.

In step B, the analyte and reagent ions are simultaneously confined inside the linear ion trap (13') by pseudo-potential barriers and DC potential barriers at the outer ends. The ion-ion reaction between the analyte cations and the reagent anions does not start before both ion groups are actively mixed inside the linear ion trap by turning off the separating DC potential barriers around both segments. The step C (quenching the ion-ion reactions) and step D (ejecting analyte and product ions) are the same as in embodiment shown in FIG. 1.

Figure 5:
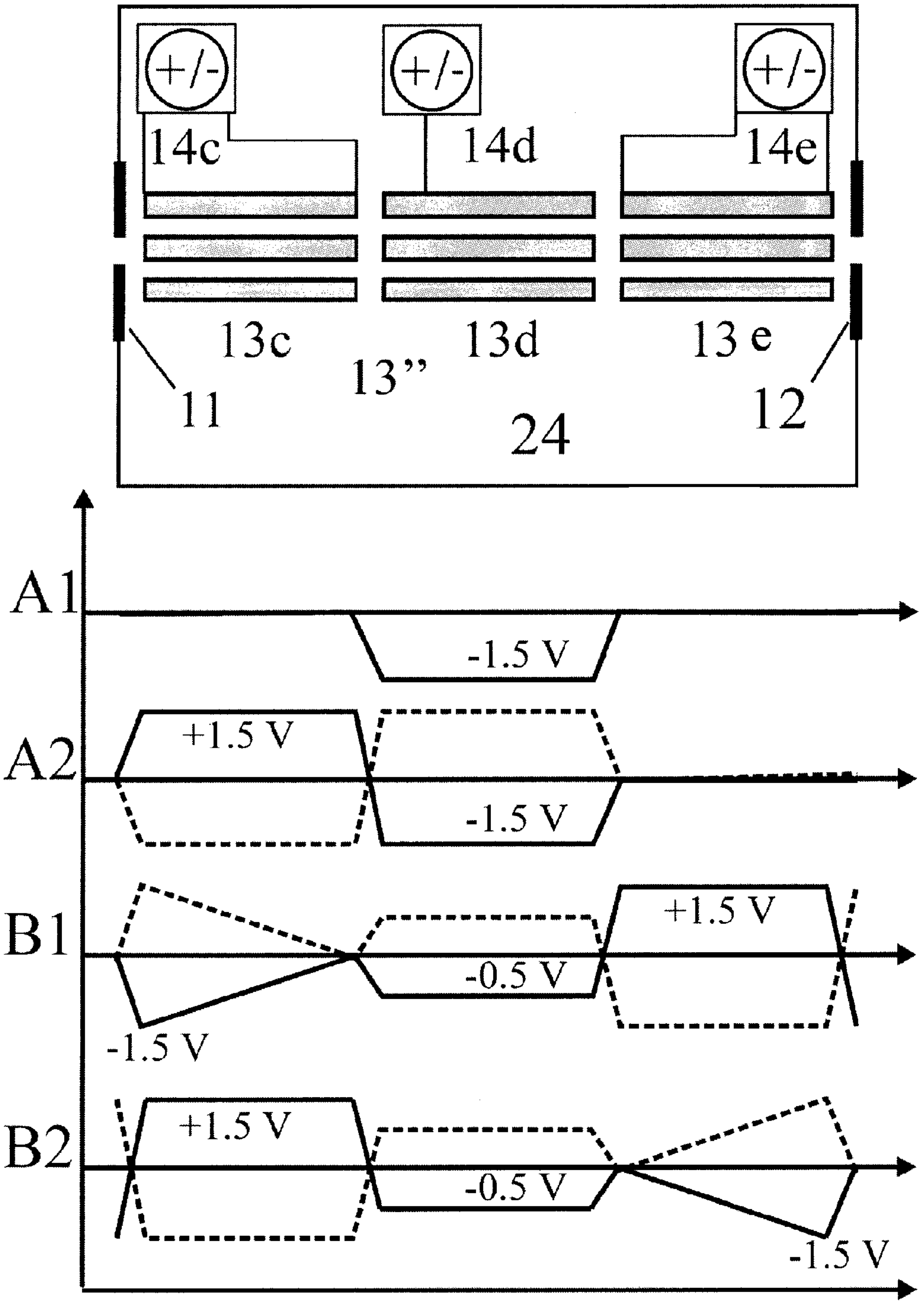
FIG. 5 shows schematic representations of a third embodiment of a linear ion trap operation wherein the analyte ions are confined in the middle segment of a segmented linear ion trap by DC potential barriers and the reagent ions are driven across DC potential barriers of the middle segment by DC potential gradients in the outer segments.

FIG. 5 shows schematic representations of a third embodiment of a linear ion trap operation wherein a linear ion trap (13") is divided into three segments (13*c*) to (13*e*), each segment comprising a hexapole rod set. In alternate embodiments, linear ion trap (13") may comprise a multipole of any number of rods. The analyte cations are confined in the middle segment (13*d*) of the linear ion trap (13") by DC potential barriers, whereas the reagent anions are stored in the front and back segments (13*c*) and (13*e*) and moved across the middle segment by DC potential gradients provided along the front and back segments. Pseudo-potential barriers are not necessary in this embodiment. The rods of the hexapole rod sets in the front and back segments (13*c*) and (13*e*) comprise thin conductive coatings that are isolated by an insulating layer from metallic rods. The RF voltages for radially confining ions are applied to the coatings together with DC potentials. Due to the resistivity of the thin coatings, a DC voltage can be applied to both ends of the segmented rods in order to provide DC potential gradients along the segments (13*c*) and (13*e*). In alternate embodiments, the hexapole segments (13*c*) and (13*e*) may be further segmented and the DC potential gradient may be produced by applying appropriate DC potentials to each sub-segment. In further alternate embodiments, the DC potential gradients may be produced by any known prior art method.

In step A1, analyte cations from the electrospray ion source (1) are introduced into the linear ion trap and stored in the middle segment (13*d*) by applying appropriate DC potentials to the hexapole rods of segments (13*c*) to (13*e*) and the end electrodes (11) and (12). The analyte anions are trapped in the middle segment (13*c*) in a DC potential well of −1.5 V. In the following step A2, reagent anions are introduced and stored in the front segment (13*c*) of the linear ion trap (13") by applying appropriate DC potentials to both ends of the rods of the front segment (13*c*) and to the end electrode (11), namely +1.5 V and +0 V, respectively. The analyte and reagent ions are stored spatially separated in the segments (13*c*) and (13*d*). The reagent anions do not have to overcome a pseudo-potential barrier at the front end, i.e. the reagent anions can be introduced with high efficiency.

In step B1, a DC voltage is applied between the ends of the hexapole rods in segment (13*c*) providing a DC potential gradient along the front segment (13*c*). The DC potential gradient drives reagent ions from the front segment (13*c*) over the DC potential barrier of the middle segment (13*d*) into the back segment (13*e*). Here, the reagent anions are trapped again in a DC potential well generated by appropriate DC potentials applied to both ends of the hexapole rods in segment (13*e*) and to the end electrode (12). The analyte cations stay confined in the middle segment (13*d*). Ion-Ion reactions can take place while the reagent anions are passing through the middle segment (13*d*).

In step B2, the reagent anions are moved from the back segment (13*e*) through the middle segment (13*d*) into the front segment (13*c*). The DC potential gradient in the back segment (13*e*) is provided in the same way as in the front segment (13*c*) in step B1. The steps B1 and B2 are preferably repeated in order to achieve a sufficient number of product ions. As in the above embodiments, the ion-ion reaction can be terminated by ejecting the remaining reagent anions from the linear ion trap. The product ions can subsequently be ejected together with remaining analyte ions from the linear ion trap (13") and transferred to a mass analyzer.

A number of embodiments of the invention have been described above. Nevertheless, it will be understood that various modifications may be made without departing from scope of the present invention. For example, the steps of the described methods can be performed in a different order and still achieve desirable results. The described techniques can be applied to other kind of ion traps.

What is claimed is:

1. A method of confining a first group of ions with a first polarity and a second group of ions with a second polarity opposite to the first polarity within a linear ion trap, the linear ion trap having two ends and comprising at least one set of electrodes, the method comprising:

(a) providing RF voltages to the electrodes to radially confine ions in the first group and ions in the second group in the linear ion trap; and (b) providing a combination of DC and pseudo-potential barriers to axially confine ions in the first and second groups in the linear ion trap; wherein ions in the first group are axially confined substantially by DC potential barriers and ions in the second group are axially confined substantially by pseudo-potential barriers.

2. A method of confining a first group of ions with a first polarity and a second group of ions with a second polarity opposite to the first polarity within a linear ion trap, the linear ion trap having two ends and comprising at least one set of electrodes, the method comprising:

(a) providing RF voltages to the electrodes to radially confine ions in the first group and ions in the second group in the linear ion trap; and (b) providing a combination of DC and pseudo-potential barriers to axially confine ions in the first and second groups in the linear ion trap wherein ions in at least one of said first and second groups are retained in the linear ion trap substantially via DC potential barriers and wherein ions in the first group have a higher mass than ions in the second group and pseudo-potential barriers are adjusted so as not to axially confine the ions in the first group in the linear ion trap.

3. The method of claim 2, wherein ions in the first group are introduced into the linear ion trap prior to ions in the second group.

4. The method of claim 3, wherein, in step (b), DC potential barriers are provided before introducing ions in the first group into the linear ion trap and pseudo-potential barriers are provided after introducing ions in the first group into the linear ion trap and prior to introducing ions in the second group into the linear ion trap.

5. The method of one of claims 1 or 2, wherein ions in the first group are analyte ions and ions in the second group are reagent ions suitable for facilitating reactions between ions on both of the groups to produce product ions.

6. The method of claim 5, wherein the reagent ions are suitable for electron transfer dissociation (ETD), negative electron transfer dissociation (NETD) or charge reducing proton transfer reactions (PTR).

7. The method of claim 5, wherein analyte ions having a predetermined mass are isolated from other ions in the linear ion trap by resonance ejection or prior to introducing the analyte ions into the linear ion trap.

8. The method of claims 1 or 2, wherein the at least one set of electrodes is a set of 2N rods, with N an integer greater than one, and an RF voltage is applied in a first phase to every second rod and in an opposite phase to the remaining rods for radial confinement of the ions in the first and second groups.

9. The method of claims 1 or 2, wherein the linear ion trap has a central axis and wherein, in step (b), pseudo-potential barriers at the two ends of the linear ion trap are generated by one of the group consisting of (i) applying an additional RF voltage to additional electrodes arranged at one of (1) the two ends of the linear ion trap and (2) positions along the linear ion trap, (ii) one of applying an unbalanced RF voltage to the electrodes and of arranging the electrodes such that a time-varying potential is formed at the central axis of the linear ion trap and (iii) applying an additional RF voltage of a single phase to all electrodes.

10. The method of claims 1 or 2, wherein the set of electrodes is a set of apertured electrodes that are arranged along a central axis of the linear ion trap and have hyperbolic indentations extending into the aperture.

11. The method of claims 1 or 2, wherein DC potential barriers at the two ends of the linear ion trap are generated by applying DC potentials to the electrodes of the linear ion trap and to an end electrode adjacent to each of the two ends of the linear ion trap.

12. The method of claim 11, wherein the ions of the first group are positively charged and the DC potential difference between the electrodes of the linear ion trap and the end electrodes is between −0.2 to −2.0 Volts.

13. The method of claim 11, wherein the ions of the first group are negatively charged and the DC potential difference between the electrodes of the linear ion trap and the end electrodes is between 0.2 to 2.0 Volts.

14. The method of claims 1 or 2, wherein the linear ion trap comprises a first and a second segment and wherein, before step (b), ions in the first group are introduced into the first segment and ions in the second group are introduced into the second segment and step (b) comprises confining ions in the first ion group in the first segment and confining ions in the second ion group in the second segment by DC potential barriers of appropriate polarity between the first and second segments so that ions in the first and second ion groups initially do not mix, providing pseudo-potential barriers and DC potential barriers at the two ends of the linear ion trap and turning off the DC potential barriers between the first and second segments so that ions of the first and second group may mix.

15. A method of reacting ions of opposite polarity within a linear ion trap having two ends and comprising a set of electrodes divided into three segments, the method comprising:

(a) providing DC potential barriers between the segments and at the ends of the linear trap to axially confine a first ion group in the middle segment and a second group of ions in a front end segment, the second group of ions having opposite polarity than the first group of ions;

(b) providing RF voltages to the electrodes to radially confine the first ion group and the second ion group in the linear ion trap;

(c) introducing the first group of ions into the middle segment and the second group of ions into the front end segment; and (d) providing DC potential gradients in the front end segment and in a back end segment to move ions of the second group from the front end segment across the DC potential barrier of the middle segment into the middle segment to facilitate reactions between the both ion groups and then to move ions from the middle segment into the back end segment wherein DC potential gradients in both outer segments are alternately turned on and off such as to move ions of the second group repeatedly between the front end segment and the back end segment, while passing through the middle segment to facilitate reactions between ions in the first group and ions in the second group.

16. The method of claim 15, wherein the set of electrodes comprises a set of segmented rods.

17. The method of claim 16, wherein the DC potential gradients are provided by applying DC potentials to segments of rods in the outer segments or by applying DC potentials together with the RF voltages to thin conductive coatings of the rods in the outer segments, the conductive coatings being isolated by an insulating layer from the rods.

18. The method of claim 15, wherein the set of electrodes is a set of apertured electrodes that are arranged along a center axis of the linear ion trap and have hyperbolic indentations extending into the aperture.

* * * * *